Jan. 28, 1941. B. D. HUBBELL 2,229,654
TRANSMISSION
Filed March 7, 1938 3 Sheets-Sheet 2
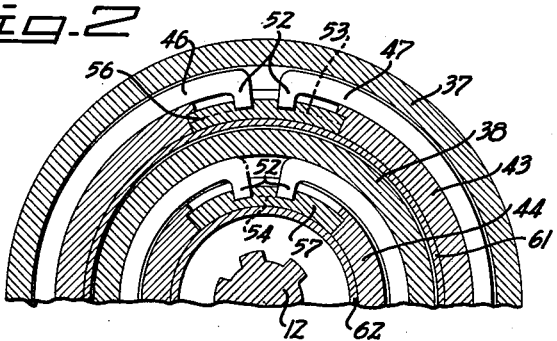
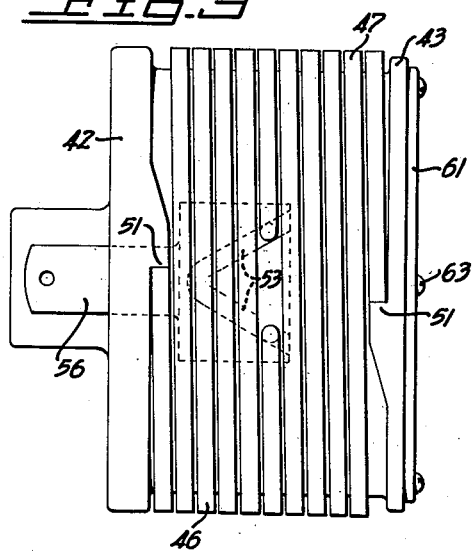
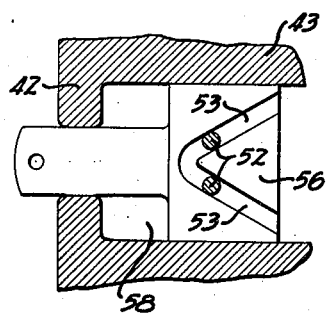
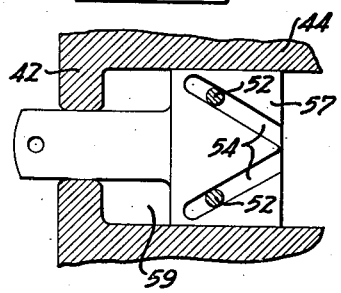
INVENTOR
BERT D. HUBBELL
BY
HIS ATTORNEY

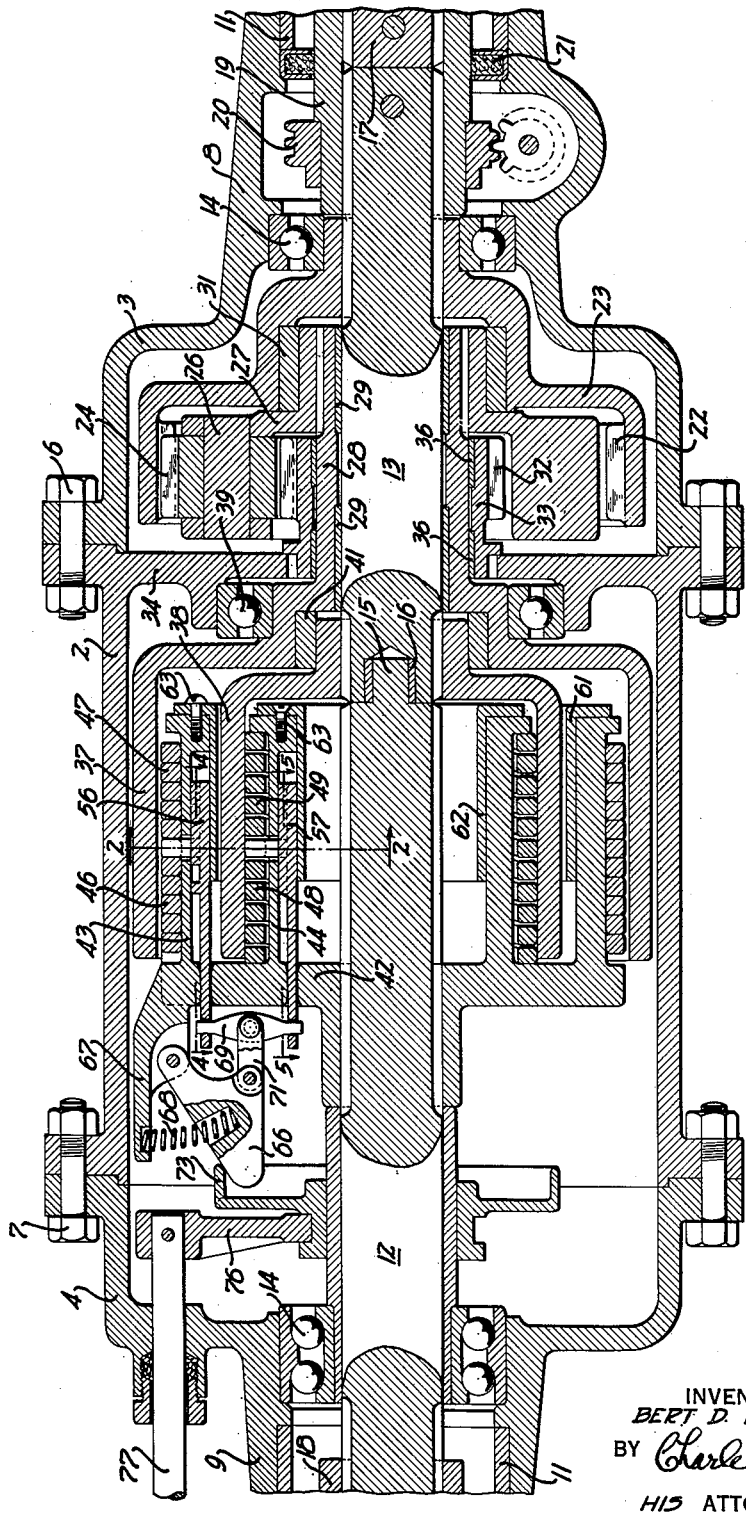

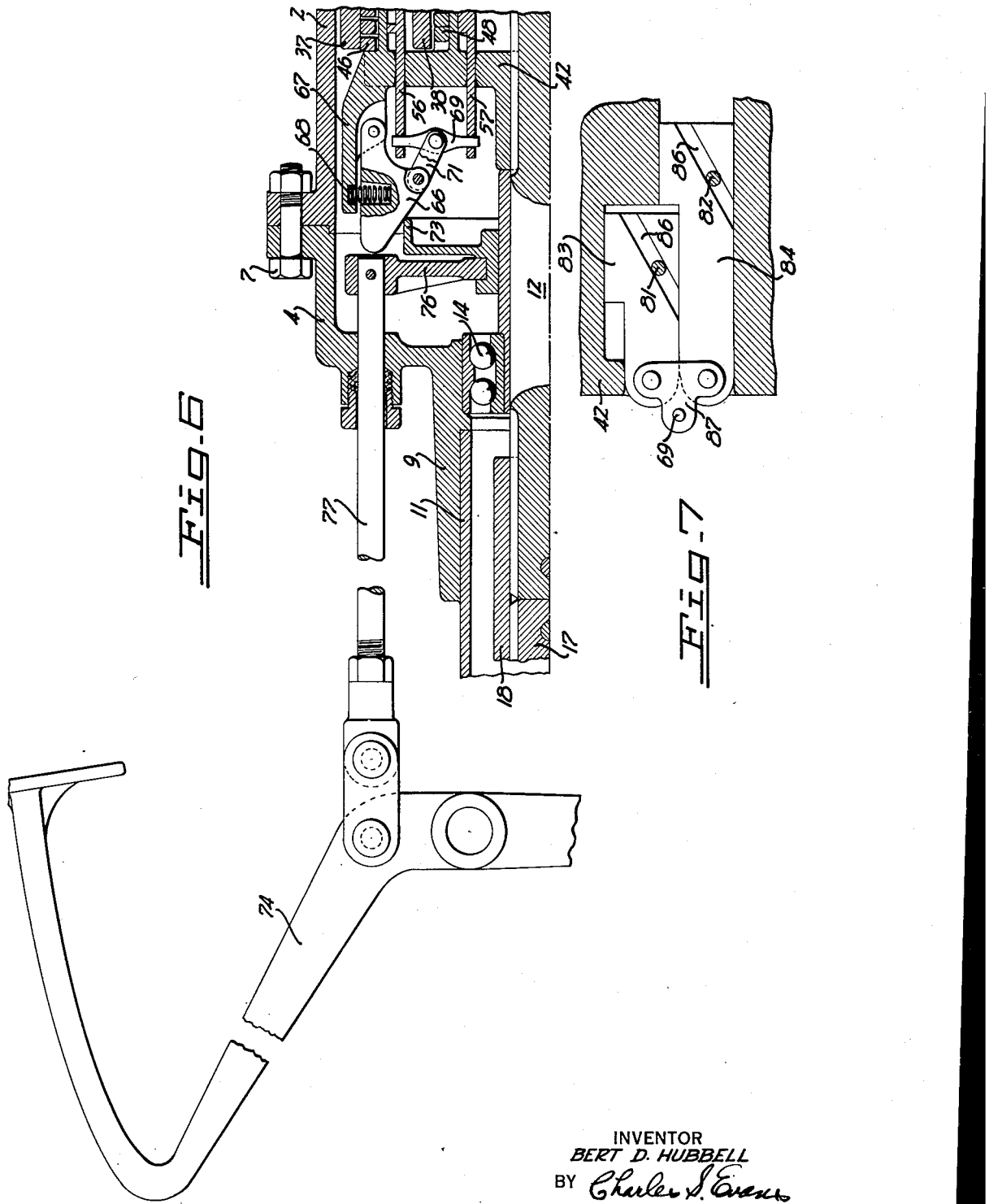

Patented Jan. 28, 1941

2,229,654

UNITED STATES PATENT OFFICE 2,229,654

TRANSMISSION

Bert D. Hubbell, Los Angeles, Calif., assignor to Perfecto Gear Differential Co., Bellingham, Wash., a corporation of Washington Application March 7, 1938, Serial No. 194,369

15 Claims. (Cl. 74—260)

My invention relates to speed change transmissions; and more particularly to an overdrive unit for automobiles.

The broad object of my invention is to provide a transmission in which the shifting from one speed to another is accomplished automatically and in response to the speed of the drive shaft.

Another object is to provide a direct drive connection between the drive and driven shafts, and to provide means for connecting the shafts together through an overdrive gearing when the speed of the drive shaft exceeds a predetermined value.

A further object of the invention is to provide a semi-automatic transmission embodying means whereby the transmission can shift from one speed to another only when the regular clutch pedal has been depressed to disconnect the engine from the drive train.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is an axial sectional view of a transmission embodying the improvements of my invention; and Figure 2 is a fragmentary transverse vertical sectional view taken in a plane indicated by line 2—2 of Figure 1, showing the cam elements for turning the adjacent ends of the pairs of the clutch springs.

Figure 3 is a plan view of a pair of the helical clutch springs apart from the clutch ring, showing the winding of the springs and the connections for the ends of the springs.

Figure 4 is a fragmentary sectional view taken in a plane indicated by line 4—4 of Figure 1, showing the cam element for expanding the overdrive clutch springs into engagement with their clutch ring; and Figure 5 is a similar view taken in a plane indicated by line 5—5 of Figure 1, showing the cam element for expanding the direct drive clutch springs into engagement with their clutch ring; and Figure 6 is a fragmentary view partly in section and partly in elevation, showing the connection between the transmission and the regular clutch pedal.

Figure 7 is a view similar to Figures 4 and 5, showing a modified cam structure for actuating springs wound in opposite directions.

In terms of broad inclusion, the transmission embodying my invention comprises drive and driven shafts, and a gearing connected for rotation with the driven shaft. A clutch is provided for connecting the shafts together for rotation as a unit, and a second clutch is provided for connecting the drive shaft to the gearing. Means actuated by a centrifugal weight is also provided for engaging either one or the other of the clutches. The clutches are preferably in the form of helical springs engageable with associated clutch rings and having one end thereof connected with the drive shaft. The means for engaging the clutches preferably comprises movable cam elements connected with the ends of the springs for turning the latter to expand the clutch springs into engagement with the clutch rings upon movement of the cams by the centrifugal weight. Means are also preferably provided for holding the centrifugal weight against movement, and means operably connected with the main clutch of the automobile is provided for releasing the weight holding means.

In greater detail, and referring to the drawings, the transmission of my invention is contained in a housing adapted to be interposed in the torque tube of an automobile. While the transmission is shown in the torque tube behind the ordinary speed change transmission, it is understood that the unit may be incorporated in the drive train ahead of the ordinary transmission.

The housing comprises an annular intermediate section 2 fastened to bell-shaped end sections 3 and 4 by suitable bolts 6 and 7. End sections 3 and 4 are provided with necks 8 and 9 adapted to be connected with the end portions of the torque tube 11. A drive shaft 12 and driven shaft 13 are provided in the housing, journaled in suitable bearings 14. These shafts are axially aligned and the drive shaft preferably has a reduced end 15 journaled in the recessed end of the driven shaft in a bearing sleeve 16. The shafts are connected to the driving and driven sections of the propeller shaft 17 by suitable sleeves 18 and 19. Driven sleeve 19 also preferably carries the speedometer gear 20, and an oil retaining ring 21 is preferably interposed between the sleeve and housing.

A planetary gear system is arranged in housing portion 3 to provide an overdrive gearing, and comprises an orbit or ring gear 22 formed in a cup-shaped mounting 23 splined on the driven shaft. The hub of the mounting is also journaled in the shaft bearing 14. Planet pinion 24 of the planetary system is journaled on a shaft 26 carried by a spider 27 splined on the inner end of a sleeve 28 journaled on the driven shaft on suitable bearing sleeves 29. The hub of spider 27 is also journaled in the recessed end of orbit gear mounting 23, in a bearing sleeve 31. A plurality, say three, of these planet pinions are preferably provided.

Sun gear 32 of the planetary system is formed on the end of a sleeve 33 splined in a fixed element or flange 34 of the housing section 2. Sun gear sleeve 33 is also supported by sleeve 28 about which the sun gear is disposed, and bearings 36 are provided between these sleeves. The sun gear of the planetary system is thus fixed to the housing and is held against rotation at all times, so that when the pinions planetate the orbit gear is caused to overrun to give an overdrive.

Clutch means are provided for connecting drive shaft 12 either directly to the driven shaft or to the gearing. One-way clutches are preferably provided for this purpose, arranged in pairs so as to prevent one shaft from overrunning the other. The clutch mechanism preferably comprises a pair of concentric cup-shaped clutch rings 37 and 38 arranged in housing portion 2 about the inner end of the drive shaft. The outer clutch ring 37 is connected to the gearing and is formed on the end of the planet pinion mounting sleeve 28; and is journaled in a bearing 39 held by housing flange 34. Inner clutch ring 38 is splined directly on the inner end of driven shaft 13 and its hub is journaled in the recessed end of cup 37 in a bearing 41.

The remaining portion of the clutch mechanism is carried by a rotor 42 splined on the drive shaft. This drive rotor has two annular flanges 43 and 44, one lying adjacent the inner peripheral surface of the overdrive clutch ring 37 and the other adjacent the inner peripheral surface of the direct drive clutch ring 38. A pair of helical clutch springs 46 and 47 are disposed about flange 43, and a similar pair of clutch springs 48 and 49 are disposed about flange 44. These clutch springs lie between the flanges and the clutch rings and function to connect drive rotor 42 with the clutch rings when the springs are expanded to engage the rings.

As shown in Figure 3 the springs of each pair are right hand wound and the outer ends of the springs are arranged to abut shoulders 51 on the drive rotor. Figure 3 shows only the outer or overdrive springs 46 and 47, it being understood that the inner or direct drive springs 48 and 49 are arranged in a similar manner. As shown in Figure 2, the opposing inner ends of the springs of each pair are provided with inturned ends 52 engaging inclined grooves or camways 53 and 54 in cam elements 56 and 57 slidably mounted in the rotor for movement axially of the clutch springs. These cam elements project through openings in the end of the rotor and slide in slots 58 and 59 provided in the rotor flanges 43 and 44. The inner ends of the cam elements are supported by sleeves 61 and 62 extending into the rotor flanges and secured by screws 63.

Figures 4 and 5 show how camways 53 converge forwardly and camways 54 converge rearwardly. By this arrangement the opposing inner ends of overdrive springs 46 and 47 are rotated out or pushed apart to expand the springs when cam element 56 is moved out, and are rotated in or pulled together to contract the springs when the cam element is moved in. Since the camways 54 are inclined in the opposite direction, the action of the direct drive springs 48 and 49 is reversed, namely, the springs are contracted when cam element 57 moves out and are expanded when the element moves in.

As a result, simultaneous in and out movement of the cams operates to engage either one or the other pair of spring clutches. In the arrangement shown, outward movement of the cams expands the overdrive springs into engagement with clutch ring 37, and inward movement of the cams expands the direct drive springs into engagement with clutch ring 38; it being understood that engagement of one pair of clutch springs is accompanied by a simultaneous disengagement of the other pair. Engagement of either pair of clutch springs therefore completes the driving connection between the drive shaft and one or the other of the clutch rings.

The driving connection is effected through the springs by reason of the abutting engagement between the outer ends of the springs and the driving rotor. Thus when the overdrive springs are engaged, and the rotor is rotating clockwise as viewed from the left in Figures 1 and 3, the driving thrust is on the outer end of the left hand spring, tending to further unwind the spring into frictional engagement with its clutch ring. The clutch ring is therefore driven clockwise by the clutch spring, and this driving torque is then transmitted through the overdrive gearing to the driven shaft.

Likewise when the direct drive clutch springs are expanded, clockwise rotation of the driving rotor puts the thrust on the outer end of the left hand spring, and the driving torque is transmitted directly to the driven shaft. This gives the direct drive connection.

By arranging the springs in pairs a driving connection is completed from the driving rotor to the clutch rings in either direction of rotation of the drive shaft. Thus when the drive shaft is rotating counterclockwise (also as viewed from the left in Figures 1 and 3) as would be true if the car was put in reverse, the driving thrust is put on the outer end of the right hand spring. Another feature of the twin spring arrangement is that it prevents the driven shaft from overrunning the drive shaft and thereby eliminates free-wheeling.

Means controlled by a centrifugal weight 66 is provided for engaging the clutch springs. Weight 66 is pivoted to an arm 67 projecting from drive rotor 42 and a spring 68 is compressed between these parts so that the centrifugal weight moves in and out, depending upon the speed of the drive shaft. A linkage is provided for connecting cam elements 56 and 57 for movement with the weight, and comprises an arm 69 engaging holes in the cam elements and pivotally connected at its center to the weight by a link 71. Arm 69 thus also functions as an equalizing bar.

It is thus seen that when weight 66 moves out the overdrive clutch springs are engaged, and when the weight moves in the direct drive clutch springs are engaged. The centrifugal weight spring 68 is designed to allow the weight to swing out to shift into overdrive at a predetermined speed, say 45 M.P.H.

Means are also preferably provided for holding the centrifugal weight in either its inward or outward position, and means are provided for releasing the holding means to allow the weight to move only at such times when the engine has been disconnected from the drive train. By doing this the transmission shifts when no driving torque is on the drive shaft, and therefore the spring clutches engage easily and silently without the clatter and stresses that would accompany engagement of the clutches under load.

As shown in Figures 1 and 6, a cup-shaped member 73 is slidably mounted for free rotation on the drive shaft, and is designed so that the rim of the cup engages centrifugal weight 66 to hold the latter either in or out, depending upon where the weight happens to be when the cup slides back. The cup is preferably connected with the ordinary clutch pedal 74 of an automobile by a yoke 76 and connecting rod 77, so that the cup is moved out to free the weight when the main clutch is disengaged. When it is desired to go into overdrive the driver merely has to press in the clutch pedal and let it out again. The transmission will then automatically shift into overdrive, providing of course that the speed is sufficient to throw the centrifugal weight out.

The transmission will then stay in overdrive until the driver again depresses the clutch pedal, at which time the transmission will shift back into direct drive, providing again that the speed is low enough to allow the weight to move in. This shift back into direct drive naturally happens whenever the regular transmission is shifted into a lower gear, because the clutch pedal is depressed for making the regular gear shift and at such times the car speed is low enough to allow the weight to move in.

In the described hook-up with the clutch pedal my transmission is therefore not wholly automatic, but is semi-automatic depending in part upon the operator depressing the clutch pedal. It is understood however that the weight holding means may be omitted, causing the shift into and out of overdrive to depend wholly upon speed. The semi-automatic arrangement is preferred however because it gives the operator a certain measure of control and insures quiet and smooth operation of the overdrive unit without clatter or stress between the engaging parts.

In the above described transmission the pairs of helical clutch springs are wound in the same direction, that is, each pair is either right hand wound or left hand wound (the particular springs shown being all right hand wound). It is to be understood however that the springs in each pair may be wound in opposite directions and the same results secured. Thus in Figure 7 a cam arrangement is shown for a pair of springs 81 and 82, the left of which is right hand wound and the right of which is left hand wound. Here the outer end of the spring at the left abuts the drive rotor and the inner end engages the cam, while the inner end of the spring at the right abuts a central shoulder on the rotor and the outer end engages the cam.

The cam preferably comprises two relatively slidable sections 83 and 84, each having parallel inclined grooves 86 for engaging the ends of the springs. When these cam sections move out the ends of the springs are both turned in the same direction, and this causes both to expand since they are wound in opposite directions. The cam shown is for the overdrive springs which expand upon outward movement of the cam, it being understood that the grooves of the direct drive cam sections would also be parallel but slope in the opposite direction from those shown in Figure 7. The outer projecting ends of the cam sections are connected by a pivoted bar 87 which receives the end of arm 69 shown in Figure 1.

I claim:

1. A transmission comprising drive and driven shafts, a gearing, a clutch engageable to establish a driving connection between the shafts, a second clutch engageable to drivably connect the shafts together through to the gearing, a centrifugal weight, means actuated by said weight for engaging either one or the other of said clutches, means for holding the weight against movement, and means for releasing said holding means.

2. A transmission comprising drive and driven shafts, a gearing having a part drivably connected with the driven shaft, a clutch ring drivably connected with a driven shaft, a second clutch ring drivably connected with a part of the gearing, a helical spring clutch connected with the drive shaft and expandible to engage one of said clutch rings, a second helical spring clutch connected with the drive shaft and expandable to engage the other clutch ring, a centrifugal weight, and means actuated by said weight for expanding either one or the other of said spring clutches.

3. A transmission comprising drive and driven shafts, a gearing having a part drivably connected with the driven shaft, a clutch ring drivably connected with the driven shaft, a second clutch ring drivably connected with a part of the gearing, a pair of helical clutch springs connected with the drive shaft and expandable to engage one of the clutch rings, a second pair of helical clutch springs connected with the drive shaft and expandable to engage the other clutch ring, and means for expanding either one or the other of said pairs of clutch springs.

4. A transmission comprising drive and driven shafts, a gearing having a part drivably connected with the driven shaft, a clutch ring drivably connected with the driven shaft, a second clutch ring drivably connected with a part of the gearing, helical spring clutches connected with the drive shaft and engageable with said clutch rings upon turning the ends of the springs, a centrifugal weight, and means actuated by said weight for turning the end of either one or the other of said springs for engaging it with its clutch ring.

5. A transmission comprising drive and driven shafts, a gearing having a part drivably connected for rotation with the driven shaft, a clutch ring drivably connected with the driven shaft, a second clutch ring drivably connected with a part of the gearing, a pair of helical clutch springs connected with the drive shaft and engageable with one of the clutch rings upon turning the ends of the springs, a second pair of helical clutch springs connected with the drive shaft and engageable with the other clutch ring upon turning the ends of the springs, and means for turning the ends of either one or the other of said pairs of springs for engaging the selected pair with their clutch ring.

6. A transmission comprising drive and driven shafts, a planetary gear system including orbit, planet and sun gears, one of said gears being drivably connected with the driven shaft, means for holding one of said gears against rotation, a clutch ring drivably connected with the driven shaft, a second clutch ring drivably connected with one of said gears, helical spring clutches connected with the drive shaft and expandable to engage said clutch rings, and means for expanding either one or the other of said spring clutches.

7. A transmission comprising drive and driven shafts, a planetary gear system including orbit, planet and sun gears, one of said gears being drivably connected with the driven shaft, means for holding one of said gears against rotation, a clutch ring drivably connected with the driven shaft, a second clutch ring drivably connected with one of said gears, helical spring clutches connected with the drive shaft and expandable to engage said clutch rings, a centrifugal weight, and means actuated by said weight for expanding either one or the other of said spring clutches.

8. A transmission comprising drive and driven shafts, a planetary gear system including orbit, planet and sun gears, the orbit gear being drivably connected with the driven shaft, means for holding the sun gear against rotation, a clutch ring drivably connected with the driven shaft, a second clutch ring drivably connected with the planet gear, helical spring clutches connected with the drive shaft and expandable to engage said clutch rings, and means for expanding either one or the other of said spring clutches.

9. A transmission comprising drive and driven shafts, a gearing having a part drivably connected with the driven shaft, a clutch ring drivably connected with the driven shaft, a second clutch ring drivably connected with a part of the gearing, helical spring clutches connected with the drive shaft and engageable with said clutch rings upon turning the ends of the springs, cams engaging the ends of the springs for turning them, and means for simultaneously moving the cams.

10. A transmission comprising drive and driven shafts, a gearing having a part drivably connected for rotation with the driven shaft, a clutch ring drivably connected with the driven shaft, a second clutch ring drivably connected with a part of the gearing, helical spring clutches connected with the drive shaft and engageable with said clutch rings upon turning the ends of the springs, cams engaging the ends of the springs for turning them, a centrifugal weight, and means actuated by said weight for simultaneously moving the cams.

11. A transmission comprising drive and driven shafts, a gearing having a part drivably connected with the driven shaft, a clutch ring drivably connected with the driven shaft, a second clutch ring concentric with said first ring and drivably connected with a part of the gearing, coaxial helical spring clutches connected with the drive shaft and expandable to engage said clutch rings, a centrifugal weight, and means actuated by said weight for expanding either one or the other of said spring clutches.

12. A transmission comprising drive and driven shafts, a gearing, a pair of one-way clutches including helical clutch springs expandable to condition them for engagement to drivably connect the shafts together through the gearing, one of the clutch springs being wound to establish said driving connection in one direction of rotation of one of said shafts and the other spring being wound to establish said driving connection in the opposite direction of rotation of said latter shaft, and means for simultaneously expanding said clutch springs.

13. A transmission comprising drive and driven shafts, a gearing having a part drivably connected with one of said shafts, a clutch ring drivably connected with a part of the gearing, a pair of coaxial clutch springs each connected at one end with the other shaft and engageable with the clutch ring upon turning of the other ends of the springs, and means for turning said latter ends of the springs.

14. A transmission comprising drive and driven shafts, a gearing having a part drivably connected with one of said shafts, a clutch ring drivably connected with a part of the gearing, a pair of coaxial clutch springs each connected at their outer end with the other shaft and engageable with the clutch ring upon turning the inner ends of the springs, and means for turning said latter ends of the springs.

15. A transmission comprising drive and driven shafts, a gearing having a part drivably connected with one of said shafts, a clutch ring drivably connected with a part of the gearing, a pair of coaxial clutch springs each connected at their outer end with the other shaft and engageable with the clutch ring upon turning the inner ends of the springs, and means for simultaneously turning the latter ends of the springs in opposite directions.

BERT D. HUBBELL.